May 23, 1972 C. E. WYCECH 3,664,682
COMBINED CRASH PAD AND AIR BAG FOR MOTOR VEHICLES
Filed July 15, 1970 2 Sheets-Sheet 1
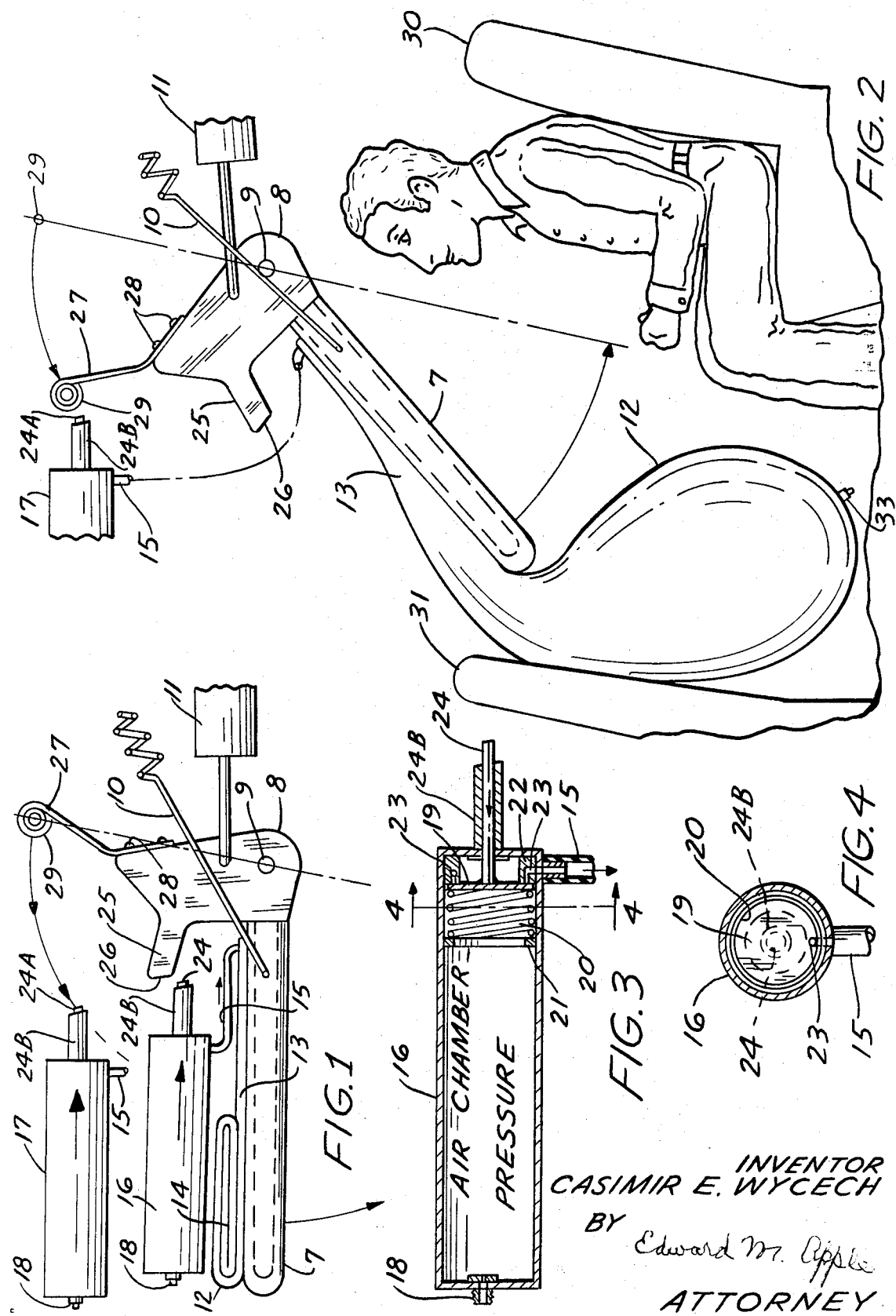
INVENTOR
CASIMIR E. WYCECH
BY Edward M. Apple
ATTORNEY

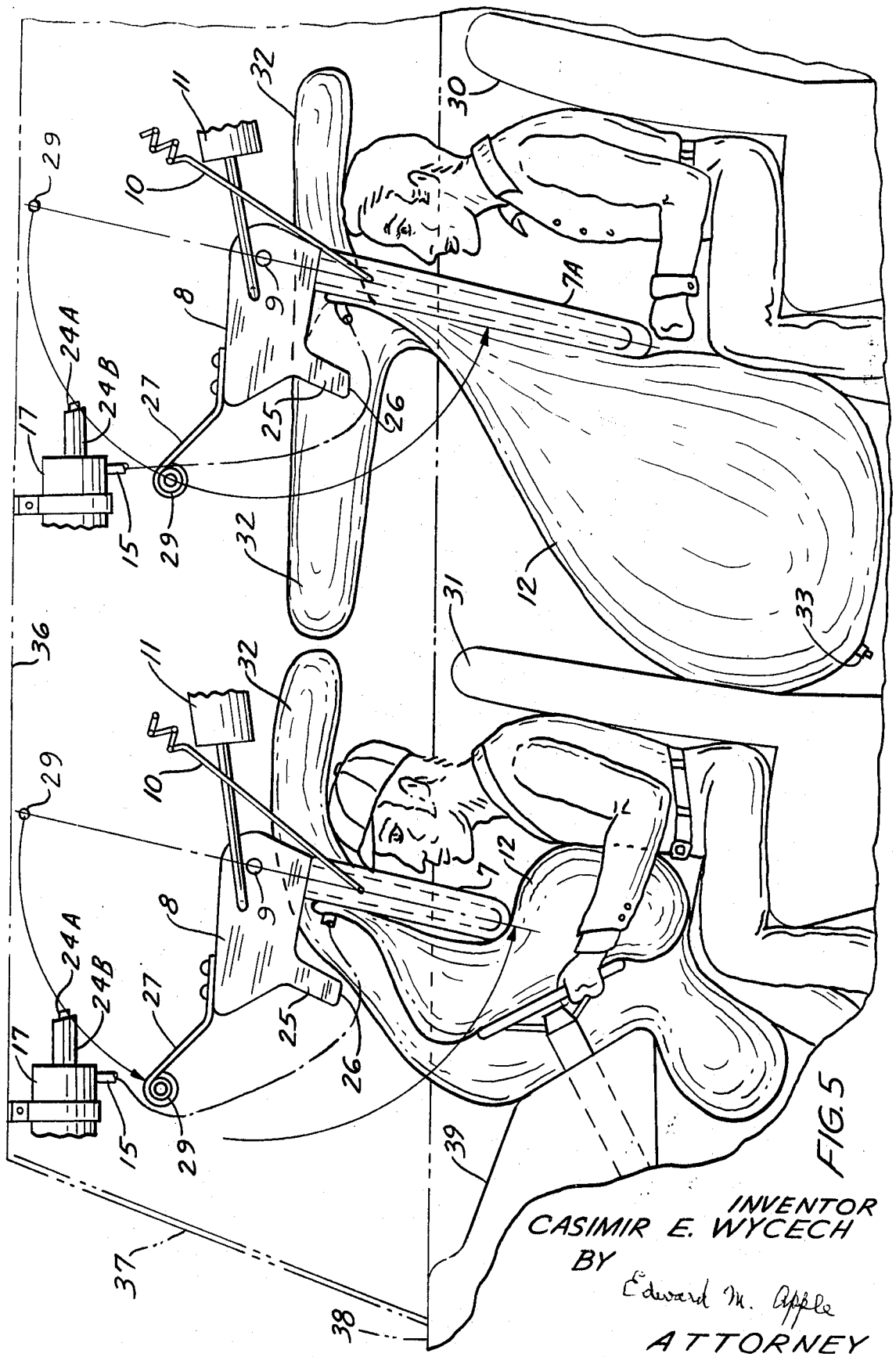

United States Patent Office 3,664,682
Patented May 23, 1972

3,664,682
COMBINED CRASH PAD AND AIR BAG
FOR MOTOR VEHICLES
Casimir E. Wycech, 5941 Argyle, Dearborn, Mich. 48126
Continuation-in-part of application Ser. No. 41,841,
June 1, 1970. This application July 15, 1970, Ser.
No. 55,158
Int. Cl. B10r 21/10
U.S. Cl. 280—150 AB                10 Claims

ABSTRACT OF THE DISCLOSURE

This application disloses a combined Crash Pad and Air Bag for motor vehicles, which is arranged to automatically move into protective position in front of the driver and passenger upon impact of the vehicle with another object at and above a pre-determined speed.

---

This invention relates to safety devices for motor vehicles and is a continuation-in-part of the invention disclosed in my copending application Ser. No. 41,841, filed June 1, 1970. In my improved device, both the padded crash shield and the air bag are automatically triggered to move into safety position in front of the passengers in the event of a collision.

I am aware of the fact that others have devised crash pads and air bags for protecting the vehicle passengers from injury, but I am not aware that anyone has devised a mechanism combining both the crash pad and the air bag to work in harmony with each other and to be simultaneously triggered into safety position when the vehicle collides with another object at speeds above a pre-determined minimum.

It is an object of this invention to improve safety devices and to provide a combined crash shield and air bag which is comparatively simple in construction, economical to manufacture, easy to install, and efficient in operation.

Another object of the invention is to combine an inflatable air bag with a crash shield, so that the passengers in the vehicle will be prevented from slipping off of the seat and onto the floor of the vehicle in the event of a collision.

Another object of the invention is to provide means for supporting the air bag in folded, non-inflated, condition and to automatically inflate and move the air bag into safety position upon the collision of the vehicle with another object.

Another object of the invention is to provide a pivotable, spring loaded, device the spring load of which, together with the weight of the pivoted portion, causes it to move into protective position and at the same time trigger an air supply, which will automatically inflate and position an air bag between the occupants of the vehicle and parts of the vehicle, upon impact of the vehicle with another object, at or over a minimum speed.

The foregoing and other objects and advantages of the invention will become more apparent as the description proceeds, reference being made from time to time to the accompanying drawing, forming part of the within disclosure, in which drawing:

FIG. 1 is a schematic view of the elements comprising the invention device, shown in the normal position of rest preliminary to an impact or a collision.

FIG. 2 is a schematic view showing the manner in which the padded crash shield and air bag are brought into position between the passengers in the rear seat of the vehicle and the front seat of the vehicle at the moment of impact of the vehicle with another object.

FIG. 3 is a section taken through on the air cylinders shown in FIG. 1.

FIG. 4 is a section taken substantially on the line 4—4 of FIG. 3.

FIG. 5 is a schematic view illustrating the manner in which the padded crash shield and the air bag are brought into position ahead of and above the driver of the vehicle. FIG. 5 also shows the relation of the padded crash shield and the completely inflated air bag, in full protective position, with respect to the rear seat passenger of the vehicle.

Referring now more particularly to the drawings, it will be understood that in the embodiment herein disclosed the reference character 7 indicates a padded crash shield which is supported on an arm 8 which is pivoted as at 9 and spring loaded as at 10 and is provided with a shock absorbing member 11, all of which are more particularly described in my copending application to which reference is made for great certainty.

In addition to the elements just described, the within invention includes an inflatable, plastic bag 12 having a portion 13 secured by any suitable means to the padded shield 7 and having a portion 14, in folded and refolded, super-imposed position on the portion 13, and the padded shield 7. The air bag 12–13 is connected by a suitable, flexible air line 15 to the air cylinders 16 and 17, both of which are charged with air under high compression. Each of the cylinders 16 and 17 is provided with an air valve 18, so that the cylinders may readily be pressurized.

Each of the cylinders 16 and 17 (FIG. 3) has a valve 19, which is spring loaded as at 20, which spring is retained between rings 21 and 22 the latter having a passageway 23, which is closed at one end by the valve 19 and communicates at the other end with the air hose 15. The valve 19 has an extension 24 which reciprocates in a fitting 24B, so that upon movement of the valve extension 24 to the left, as shown in FIG. 3, the valve 19 will uncover the passage way 23, so that the compressed air may escape the interior of the cylinder into the air bag 12. It may be noted that there is a space 21 between the periphery of the valve 19 and the cylinder wall 16, so that the compressed air may quickly pass around the edges of the valve 19 to reach the passageway 23.

The pivoted arm 8 has an extension 25 which has an angular end 26 which is arranged to strike the valve extension 24 of the cylinder 16. The opening of the valve in the cylinder 16 permits the first charge of air to enter the portion 13 of the bag 12, upon further pivoting of the arm 8 on the pivot 9, a spring finger 27, which is secured to the arm 8, by screws 28 or similar means, will bring the circular end 29 into contact with the valve extension 24A of the cylinder 17, so that the compressed air in the cylinder 17 may also enter the bag 12 to complete the inflation of the bag.

In FIG. 2, it will be seen how the bag 12–13 when partially inflated assumes a position between the passenger in the rear seat 30 and the front seat 31 of the vehicle. It will also be noted that the lower portion of the bag 12 protects the legs and knees of the passenger and prevents the passenger from slipping from the seat as a result of the collision. FIG. 2 also shows the position of the elements just prior to the triggering of the cylinder 17 to fully inflate the bag 12.

In FIG. 5, I show the position of the elements after the air bag has been completely inflated and after the padded crash shields 7 and 7A have been moved into the respective positions ahead of the driver and rear seat passenger.

In FIG. 5, I also illustrate the manner in which the air bag 12 can be provided with etxensions 32, for the protection of the heads of the driver and passengers. It will be noted that in FIG. 5 the air bag 12 is provided at the bottom with a valve 33, so that the air bag may be deflated and so that it may be refolded and used again in FIG. 5, the reference character 37 indicates the windshield, the reference character 38 indicates the hood, and the reference character 39 indicates the dash of the motor vehicle.

When the device is mounted, and set up as shown in FIG. 1 and the cylinders 16 and 17 are provided with a full charge of compressed air, the device is ready for action.

As previously described in my copending application, any impact of the vehicle with another object at a speed above five m.p.h., the velocity of the vehicle together with the weight of the padded crash shield 7 will be sufficient to momentarily overcome the tension in the spring 10, so that the shield 7 and arm 8 will pivot on the pivot 9 to the position shown in FIG. 2. In this position the spring 10 will exert downward pressure on the shield 7 as the pivot point is moved into a horizontal plane above the angular plane, in which rests the spring 10, as shown in FIG. 5. In this position the arm 25 will have actuated with valve 19 in the cylinder 16 to give an initial charge to the air bag 12 as shown in FIG. 2. As the shield 7 and the arm 8 continue to pivot on the pivot 9, the member 29 will actuate the valve in the cylinder 17 to complete the compressed air charge to the bag 12-13, as shown in FIG. 5.

It will be understood that the bag 12-13 will be of such contour as to permit it to assume the positions shown in FIG. 5, not only to protect the driver and back seat passenger from the front, but also to provide a cushion over their heads as well.

After the device has been actuated, by reason of a collision as described, it may then be returned to its normal position, as shown in FIG. 1 by evacuating the air from the bag through the valve 33, refolding it, placing it on the shield 7, then swinging the padded crash shield 7 upwardly against the shock absorbing means 11, as more particularly described in my copending application.

It is believed that the operation of the device is obvious from the foregoing description.

Having described my invention, what I claim and desire to secure by Letters Patent is:

1. A safety device for a motor vehicle comprising the combination of a padded shield and an air bag, said pivoted for positioning being in front of at least one occupant of the vehicle, a spring secured to said shield and to a fixed member of said vehicle, said spring being arranged to normally hold said shield in elevated position adjacent the roof of said vehicle and being arranged to help move said shield into lowered safety position in front of the vehicle occupant when the tension of said spring has been overcome by the weight of the shield and the velocity of the vehicle upon impact with another object, said shield normally having mounted thereon said air bag, with means to inflate the air bag upon the pivotal movement of said shield.

2. The structure of claim 1, in which said air bag when inflated assumes a position in front of and above the heads of said occupant.

3. The structure of claim 1, in which said air bag when inflated shields the occupant of the vehicle from contacting any part of the vehicle except the seat which is occupied by the occupant.

4. The structure of claim 1, in which the air bag is connected to at least one compressed air cylinder, each having a control valve operable by the pivotal movement of said shield.

5. The structure of claim 4, in which each said cylinder is provided with a valve for charging the cylinder with air under compression and the said bag is provided with a valve for deflating said bag.

6. The structure of claim 1, in which said air bag is normally supported in folded, uninflated condition by said shield.

7. The structure of claim 4, in which said shield has secured to it an arm with cam like elements thereon for actuating the valve of said cylinder.

8. The structure of claim 1, including at least one container, having therein a gas under high compression and being in communication with said bag, said container having a valve which is operable by the movement of said shield.

9. The structure of claim 1, in which said air bag has extensions thereon, which when inflated assume positions below the seat level and above the head level of the vehicle occupant.

10. The structure of claim 1, including shock absorbing means arranged to resist the reverse pivotal movement of said shield after said bag is inflated.

References Cited

UNITED STATES PATENTS

| | | | |
|---|---|---|---|
| 2,806,737 | 9/1957 | Maxwell | 280—150 X |
| 2,781,203 | 2/1957 | Kurilenko | 280—150 |
| 2,834,606 | 5/1958 | Bertrand | 280—150 |
| 2,855,216 | 10/1958 | Sacks | 280—150 |

FOREIGN PATENTS

| | | | |
|---|---|---|---|
| 1,031,160 | 6/1953 | France | 296—84 |

KENNETH H. BETTS, Primary Examiner

U.S. Cl. X.R.

296—84K